US006513217B1

(12) United States Patent
Allen

(10) Patent No.: US 6,513,217 B1
(45) Date of Patent: Feb. 4, 2003

(54) SMALL MOTOR STARTER CORD REPLACEMENT APPARATUS

(76) Inventor: Vernon Allen, 109 W. Eighth St., Tabor City, NC (US) 28463

( * ) Notice: Subject to any disclaimer, the term of this patent is extended or adjusted under 35 U.S.C. 154(b) by 0 days.

(21) Appl. No.: 09/724,099

(22) Filed: Nov. 28, 2000

(51) Int. Cl.[7] .................................................. B23P 19/04
(52) U.S. Cl. ..................... 29/402.08; 29/240.5; 29/225; 29/260; 29/263; 29/402.01; 242/375.1
(58) Field of Search .......................... 29/225, 226, 227, 29/228, 229, 240, 240.5, 259, 260, 263, 402.01, 402.03, 402.08; 242/375.1

(56) References Cited

U.S. PATENT DOCUMENTS 2,436,707 A * 2/1948 Altenburg ................... 242/442
3,115,699 A * 12/1963 Nakahira ..................... 33/423
3,263,532 A 8/1966 Amberg ........................ 81/7.5
3,348,293 A * 10/1967 Newton et al. ............ 29/240.5
3,368,266 A * 2/1968 Shultz ......................... 29/226
3,748,716 A 7/1973 Fidler .......................... 29/228
3,802,300 A 4/1974 Gillotti ......................... 81/7.5
4,088,377 A * 5/1978 Corrigan ..................... 305/147
4,105,188 A * 8/1978 Mendoza et al. .......... 254/10.5
4,558,500 A * 12/1985 Kloster ........................ 29/227
4,807,347 A 2/1989 Johnson ................... 29/402.01
5,072,499 A 12/1991 Scott ........................... 29/228
5,113,561 A 5/1992 Scott ........................... 29/228
5,214,831 A * 6/1993 Collins, Jr. et al. ........ 29/240.5
5,224,661 A 7/1993 Azar ........................ 242/54 R
6,240,611 B1 * 6/2001 Chase ......................... 29/228

* cited by examiner

*Primary Examiner*—Gregory M. Vidovich
*Assistant Examiner*—Essama Omgba
(74) *Attorney, Agent, or Firm*—Michael E. Mauney

(57) ABSTRACT

An apparatus for replacement of a starter cord in a small motor starter cord assembly. A spindle is mounted within a hub with a handle at one end and a tool fitting at the other end. The hub includes at least two arms. The arms attached to the hub are of a size to fit within a pull cord apparatus that is removed from a small motor and inverted. The arms extend to secure against the side of the pull cord apparatus. At the end of the spindle opposite a handle, a variety of tools can attach to the spindle to fit within or fit over the spring-mounted reel in a starter cord apparatus. The tool is placed within the starter cord apparatus. The arms extend to secure it in place. The tool is fitted to the reel and the handle rotated to wind the reel to a fully wound position so that a new starter cord can be threaded into the reel and tied off. The tool is then released to allow the spring to unwind hence, winding a replacement cord onto the reel. The hub may be fitted with a ratchet to permit the spindle to rotate in one direction only.

12 Claims, 5 Drawing Sheets

SMALL MOTOR STARTER CORD REPLACEMENT APPARATUS

FIELD OF THE INVENTION

The field of this invention relates to small gasoline powered motors used in a variety of home, gardening, and commercial applications and, more particularly, to a device for replacement of the starter pull cords that are commonly found on small motors.

BACKGROUND OF THE INVENTION

Small gasoline powered engines are used to power various kinds of tools. These range from string weed cutters, lawn mowers, snow blowers, pumps, generators, garden tillers, and so on. Many of these devices employ a pull cord to provide the initial impetus to start the engine. Initially, the pull cord would be hand wrapped around a reel by a user with the end being secured in a slot by a knot in the cord. When the cord was entirely wrapped around a reel, the user would pull on one end of the cord to unwind it from the reel, thus imparting a rotational movement to the reel which provided the impetus to start the engine. However, the winding and unwinding of the cord was tedious and a pull cord was soon permanently mounted on an engine in a spring biased recoil reel device. Thus, the cord automatically rewinds on its own. This is proven far more convenient than the earlier removable cord.

However, a spring-mounted reel with a permanently wound cord on that reel can lead to repairs. First, the spring itself can wear out or be broken and the cord can wear out or be broken. Repairing either the spring or the pull cord in this configuration can be a tedious and difficult job. To mount a new spring, a number of devices have been proposed (see generally Scott, U.S. Pat. No. 5,113,561; Scott, U.S. Pat. No. 5,072,449; Johnson, U.S. Pat. No. 4,087,372; Gillotti, U.S. Pat. No. 3,802,300; Fidler, U.S. Pat. No. 3,748,716; and Amberg, U.S. Pat. No. 3,263,532).

Replacing a pull cord also presents problems. First, the assembly which mounts the pull cord, reel and spring must be removed from the engine. Ordinarily, this is relatively simply done by removing several bolts and lifting the housing off. Once the housing is off, any remnants of a broken or frayed cord can usually be readily removed from the reel by cutting one end and simply unwinding the cord and pulling it off the reel. At that point, however, the repair job becomes difficult. First, the spring-loaded reel must be fully wound against the bias pressure of the spring. Usually, there is a hole or bore in the housing that must be lined up with the reel to begin the process of threading the cord through the reel. As this is taking place, the position of the reel must be maintained against the pressure of the spring in the wound position. Once the cord is threaded through the appropriate holes and tied into place, then the reel may be released to wind slack cord within the reel as the spring unwinds. The spring within the reel will take care of winding the cord up to a fully coiled position. The housing can then be replaced on the small engine, cord cut to an appropriate length, and a handle added to facilitate pulling the cord.

This job is complicated by the fact that there is no standardization in the industry regarding how the pull cord assembly fits to a mower. In some cases, a spindle may project from the top of the mower which matches a female receptor on the pull cord assembly. In other circumstances, other arrangements are provided.

Azar, U.S. Pat. No. 5,224,661 proposes an elongated shank with a handle fixed to it. At one end of the shank, opposite from the handle, is a lobed end which fits within a recoil sprocket of the pull cord assembly. One may use the handle to wind the recoil sprocket of the pull cord assembly to the fully wind the spring and thus, rewind the pull cord. Azar proposes that the shank can be mounted with a ratcheting device in order to prevent inadvertent rewinding of the recoil pulley.

Despite this work there is still a need for a tool to facilitate replacing a pull cord in a pull cord starter apparatus for a small engine. First, a tool to rewind the cord should be simple to operate and useable by one person. Second, the tool should adjust to different configurations of the pull cord housing as are found in different types of small motors. Third, the tool should be easy to use and inexpensively constructed of off-the-shelf materials. Today there is no such tool available.

SUMMARY OF THE INVENTION

The current invention consists of a spindle mounted within a housing. At one end of the spindle there is a circular handle, which can be gripped for rotational motion. The spindle is mounted with a ratchet. In approximately the area where the ratchet is mounted, a plurality of adjustable locking arms extend outwardly approximately perpendicular to the spindle. These locking arms are used to secure the spindle in place inside a housing. At a second end of the spindle, opposite from the circular handle, is a female fitting to allow several different types of devices to be removably fixed thereto. These devices are used to wind the pull cord assembly.

It is an object of this invention to be readily adjustable to different configurations of pull cord reels. It is an object of this invention to mount fixedly into place using the locking arms. It is an object of this invention to wind a pull cord reel spring while biased against movement in the opposite direction. Other features of this invention will become apparent from the Detailed Description of the Drawings.

DETAILED DESCRIPTION OF THE DRAWINGS

Figure 1A:
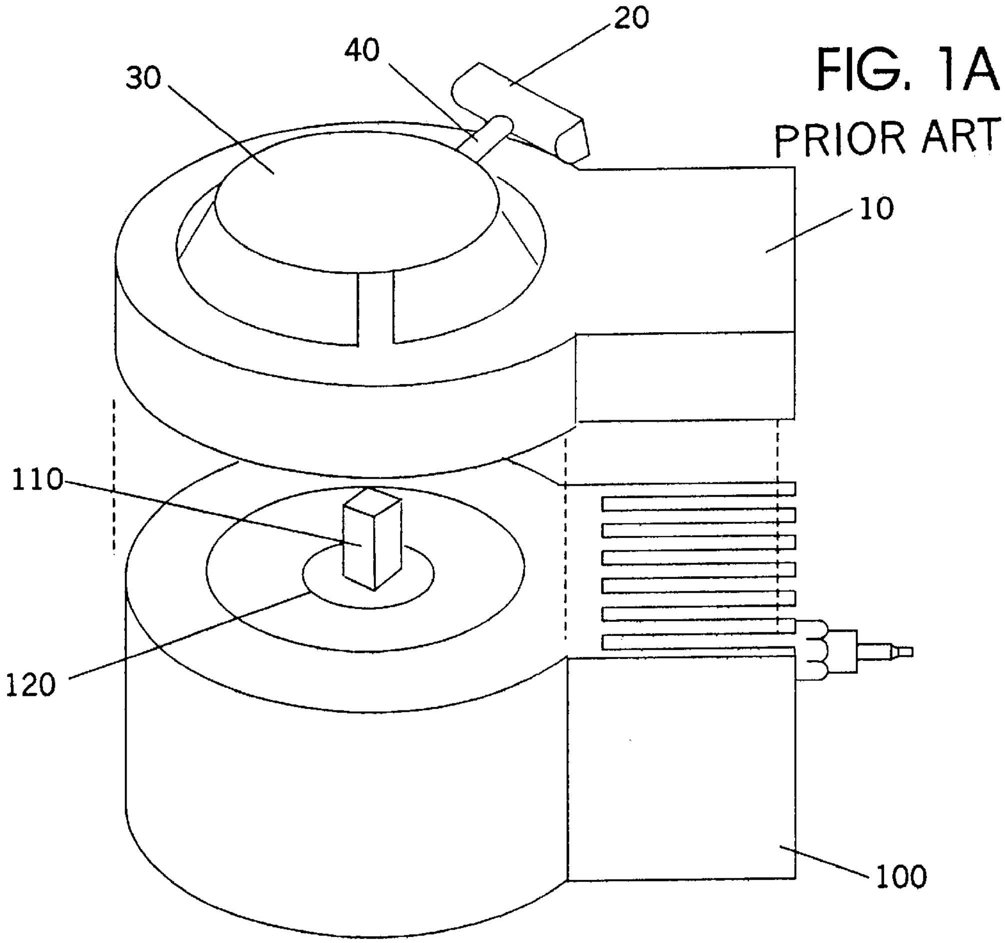
FIG. 1A PRIOR ART
FIG. 1A shows a motor and pull cord reel assembly in exploded view.
Figure 1B:
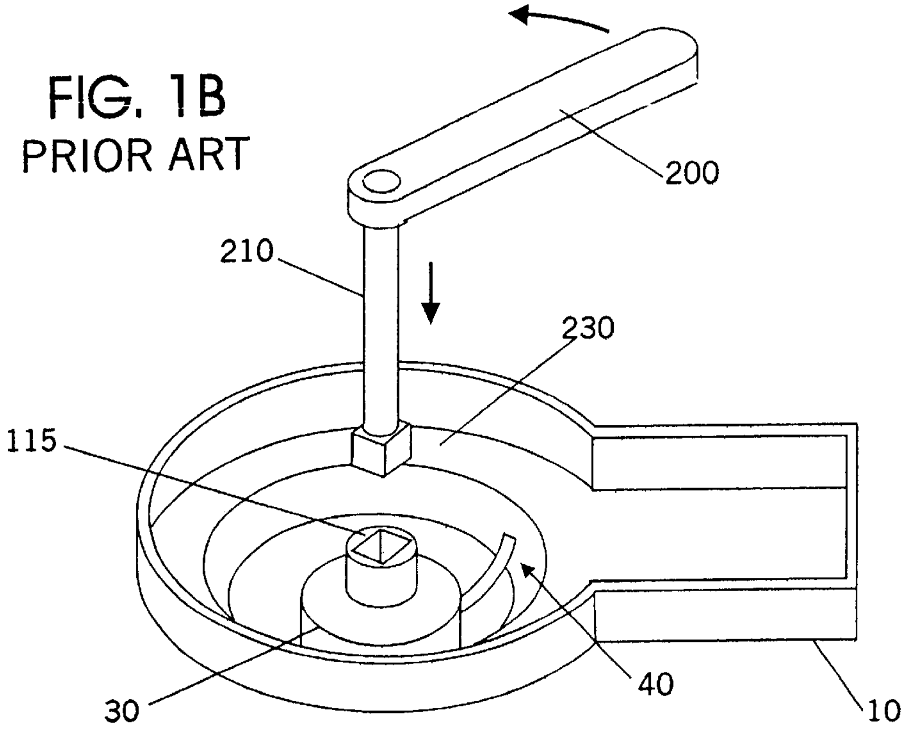
FIG. 1B PRIOR ART
FIG. 1B shows a prior art pull cord replacement tool and procedure.

FIG. 1A shows a motor (100) with the pull cord housing (10) in an exploded view above the motor (100). Ordinarily, the pull cord housing (10) bolts to the motor (100) and must be removed for repair of the pull cord reel (30). The pull cord reel (30) must be, in some way, connected to the motor (100) so that when the handle (20) is pulled it causes the pull cord (40) to unwind forcing a rotational movement of the pull cord reel (30), which in turn must cause a rotational movement of the crank shaft (not shown) in the motor (100), which gives a starting impetus to the motor that once it catches will begin to rotate on its own. Shown in FIG. 1A is a spindle (110) in the motor (100) which fits within a bore (115) on the bottom of the pull cord reel (30) (the bore (115) is seen in FIG. 1B). Ordinarily, some type of clutch (120) is required so that once the motor (100) catches and begins to rotate on its own, the pull cord reel (30) disengages from the rotational movement of the motor. In the older style motor shown in FIGS. 1A and 1B, the clutch (120) is mounted within the motor housing (100).

As shown in FIG. 1B to replace the cord (40) on the pull cord reel (30), the pull cord reel housing (10) is removed from the motor (100) and placed in a position that exposes the bore (115). Here, a ratchet wrench (200) with an extender bar (210) is shown positioned above the bore (115). If the extender bar (210) is of the correct size, it may be extended into the bore (115) and the ratchet wrench (200) rotated in the correct direction (usually counter-clockwise as shown by the rotational arrow at the end of the handle of the ratchet wrench). If the extender bar (210) is not an appropriate size to fit within the bore (115), a tool (230) may be attached to the end of the extender bar (210) which does fit the bore (115).

To replace a cord, one first removes the remnants of an old cord. One positions the ratchet wrench correctly for counter-clockwise movement. One extends the extender bar (210) with the appropriate tool (230) into the bore (115) and one rotates the handle of the ratchet wrench (200) counter-clockwise causing a corresponding counter-clockwise rotation of the pull cord reel (30). One continues this rotation until the spring within the pull cord reel (30) is fully wound. Ordinarily, there is a fitting or hole on the pull cord reel (30). One aligns this fitting with the place the cord (40) goes through the outside of the pull cord reel housing (10) to the handle (20). One then extends a replacement cord from the outside into the pull cord reel (30) and ties off the cord (40) so that it is secured within the pull cord reel (30). One then releases the ratchet on the ratchet wrench (200) which allow the pull cord reel (30) to "free wheel". The spring then forces the pull cord reel (30) to rotate clockwise, which causes slack cord (40) to be wound upon the pull cord reel (30). When the spring has fully unwound, the cord (40) is fully wound on the pull cord reel (30). It may be cut off and a handle (20) attached. The pull cord reel housing (10) is then replaced on the motor (100) with the spindle (110) fitting into the bore (115). Now one starts the motor simply by pulling the handle (20) forcing the cord (40) wound on the pull cord reel (30) to begin to unwind causing a rotational motion of the spindle (110). The clutch (120) operates to engage the motor (100), thus cranking the motor (100).

Figure 1C:
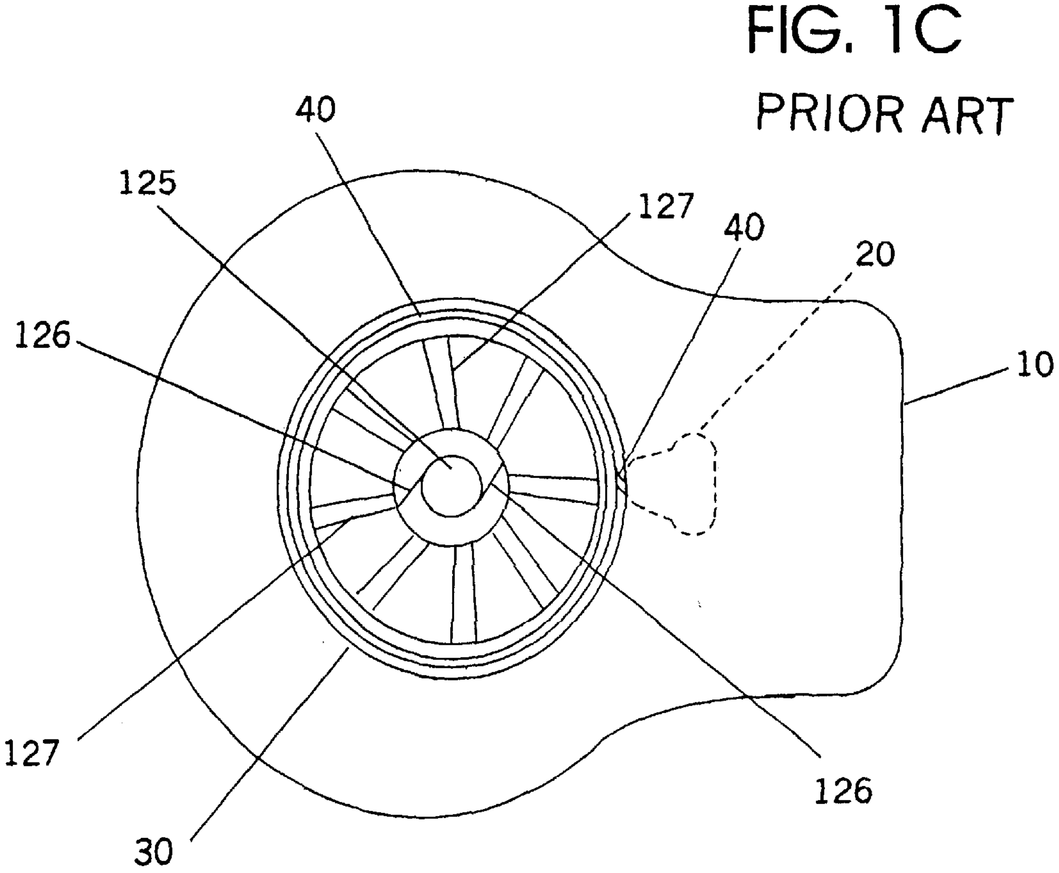
FIG. 1C PRIOR ART
FIGS. 1C and 1D shows a variation in the construction of the pull cord reel assembly.
Figure 1D:
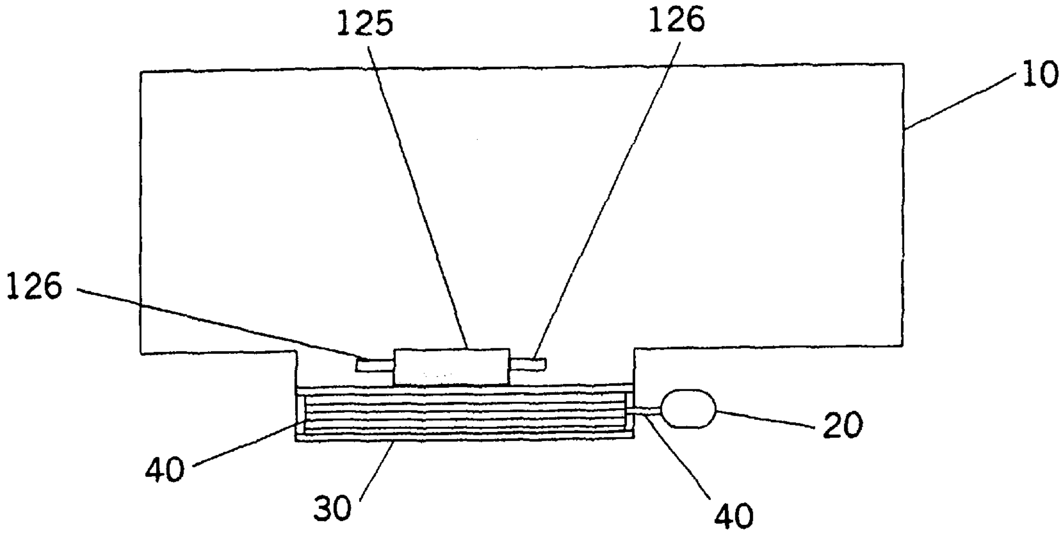
FIG. 1D PRIOR ART

FIG. 1C and 1D show an alternate embodiment of a pull cord reel housing (10). FIG. 1C shows the housing (10) from above and FIG. 1D shows the housing (10) in cut-a-way. In FIG. 1C, the cord (40) is shown wrapped around the pull cord reel (30). However, unlike the housing (10) shown in FIG. 1B, a circular clutch (125) is placed on the pull cord reel (30) in a raised position. The circular clutch (125) fits into a corresponding bore within the motor (100) (not shown). Two arms (126) extend from where the circular clutch (125) is positioned catching corresponding indentations within the bore in the motor so that when the pull cord reel (30) rotates in the appropriate direction, the arms (126) catch and force a corresponding rotation of the motor (100) (not shown). Sometimes, as is shown in FIGS. 1C and 1D, ribs (127) extend from the clutch (125) to the outside portion of the pull cord reel (30). An individual may grab these ribs (127) to rotate the pull cord reel (30) in the appropriate direction to wind the reel against the spring to replace the cord. However, this makes replacing the cord into a job requiring two people - one to wind and hold the reel and one to thread and tie off the replacement cord. It is very difficult to hold the ribs (127) against the pressure of the spring with anything other than one's fingers. Also, there are some pull cord reel housings (10) which do not have the ribs (127). In these pull cord reel housings (10), there may be only a small notch or hole somewhere on the pull cord reel (30), which makes winding the pull cord reel (30) against the pressure of the spring in order to thread and tie off a new cord (40) even more difficult without an appropriate tool.

Figure 2:
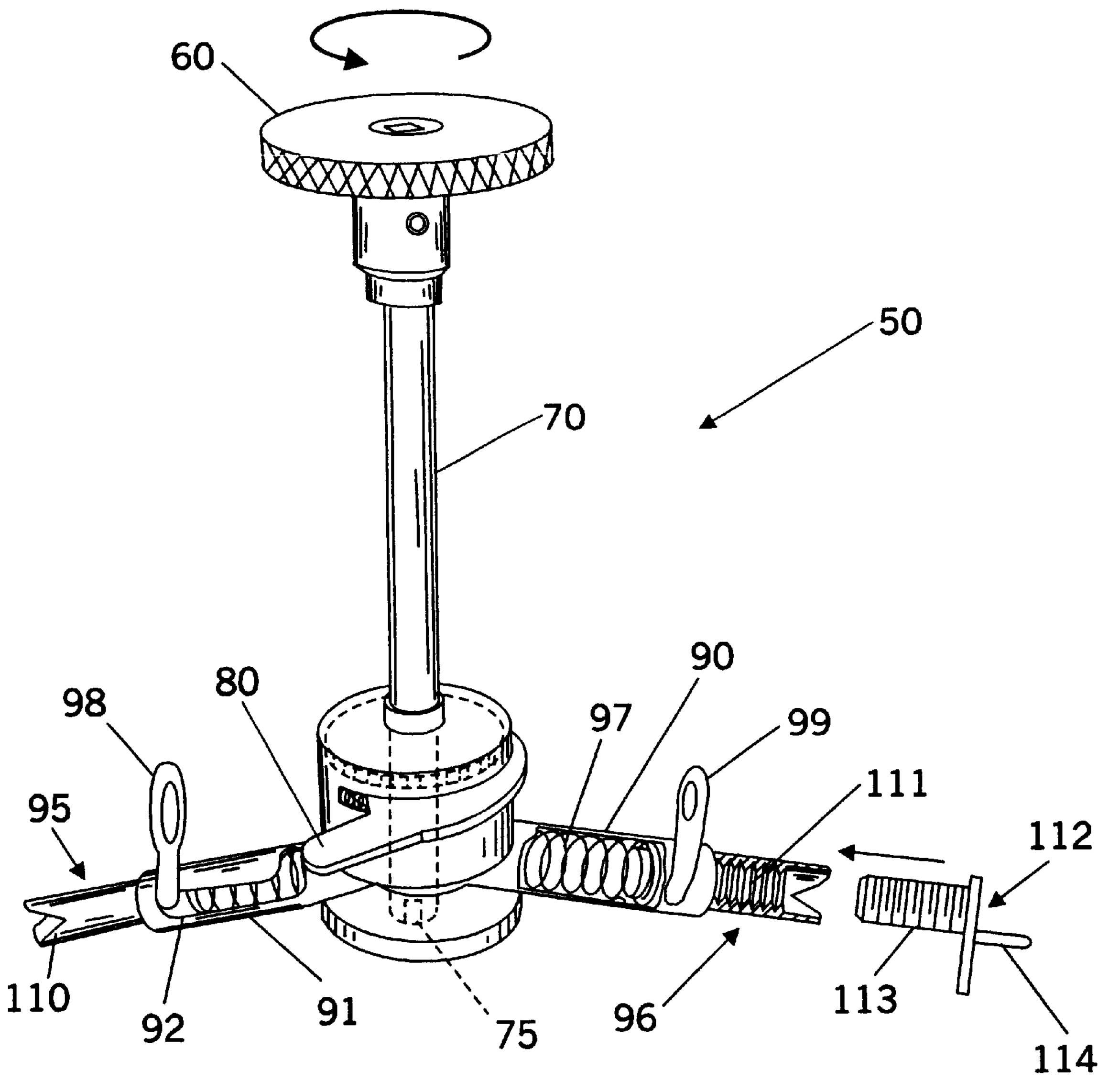
FIG. 2 shows the device in partial cut-a-way, but with no tools to be used on the pull cord reel.

FIG. 2 shows the main part of the cord replacement tool (50) invention. At one end of the cord replacement tool (50) there is a circular handle (60). On the underside of the handle (60) there is a spindle (70) which extends downwardly to a female tool fitting (75). This is not unlike the female fitting on a ratchet wrench. The spindle (70) is biased for rotation in a counter-clockwise direction by a ratchet (80). Immediately below the ratchet (80) are two locking arms (90) and (91). These locking arms (90) and (91) are mounted 1800 apart and are two hollow cylinders with L-shaped slots on the upper side of the cylinder as shown in locking arm (91). The L-shaped slot (92) is shown on the locking arm (91). There is a corresponding L-shaped slot on the locking arm (90) but it is not seen in this view since that portion of the locking arm (90) is cut-a-way to show the spring (97). Within the locking arms (90) and (91) are smaller gripping cylinders respectively (95) and (96). The spring (97) shown in cut-a-way on the locking arm (90) which is biased to force the gripping cylinder (96) outward. There is a corresponding spring also in locking arm (91) to force the gripping cylinder (95) outward. An operator can use the retracting arms (98) and (99) to pull the gripping cylinders (95) and (96) respectively to the fully retracted position against the pressure of the spring by using the L-shaped slots. The ends of the gripping cylinders (95) and (96) have four teeth arranged quadrilaterally which are designed to grip the side of the pull cord housing (10) when the cord replacement tool (50) is in use. At each end of the gripping cylinders (95, 96), there is a threaded bore respectively (110) on gripping cylinder (95) and (111) on gripping cylinder (96). The threaded bore (111) is shown in cut-a-way on the gripping cylinder (96). Some pull cord housings (10) do not have mesh ribs or other materials on which the four teeth quadrilaterally arranged on the gripping cylinders (95, 96) can find purchase. In those pull cord housings (10), it may be necessary to drill a small hole if no holes are already present in the pull cord housing (10). A gripping cylinder accessory (112) is used in conjunction with the small hole. A threaded bolt (113) designed to fit within the threaded bore (111) allows the gripping cylinder accessory (112) to be screwed into place at the end of the locking cylinder (96). Projecting from the end of the locking cylinder accessory (112) is a tooth (114) which will fit within the hole in the pull cord housing (10) for use of the gripping cylinder accessory (112). The cord replacement tool (50) can be made to operate in virtually any pull cord housing (10).

Figure 3A:
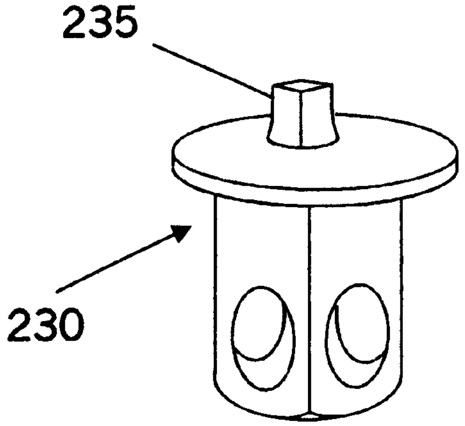
FIGS. 3A and 3B show two tools used with the device for use on a pull cord reel
Figure 3B:
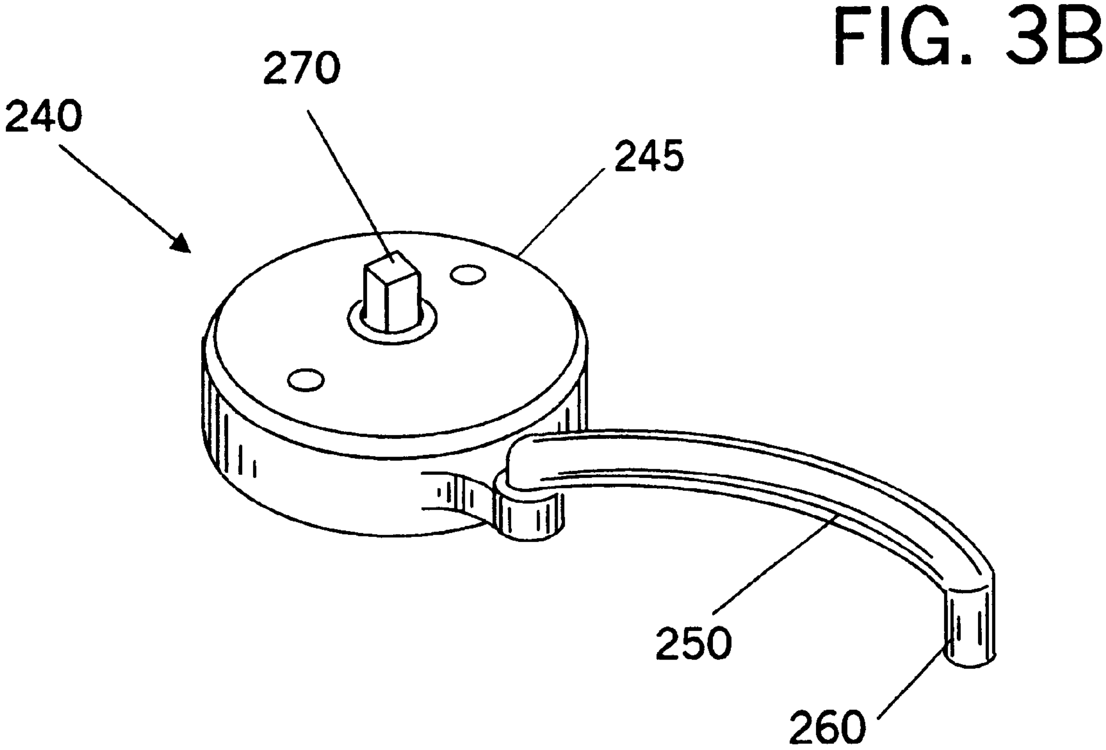

FIGS. 3A and 3B show two tools to fit within the female fitting (75) on the cord replacement tool (50). FIG. 3A shows an oblong nut-like device (230). The nut-like device (230) will fit within the bore (115) on the type of pull cord housing (10) that is shown in FIG. 1B. The nut-like device (230) has a raised male fitting (235) designed to fit within the female fitting (75) on the bottom of the cord replacement tool (50). When one wishes to change a pull cord on a pull cord housing (10), as seen in FIG. 1B, one slips the male fitting (235) into the female fitting (75) then uses the nut-like device (230) to wind the spring on the pull cord housing (10). FIG. 3B shows the type of tool fitting (240) which is used for pull cord housings (10) as shown in FIGS. 1C and 1D. The tool fitting (240) consists of a hollow disk (245). This disk is somewhat larger in diameter than the clutch (125) shown in FIGS. 1C and 1D. Disposed at or near the edge of the hollow disk (245) is a rotatable arm (250). At one end of the arm (250) a shank piece (260) extends downwardly. On top of a hollow disk (245) is a male fitting (270) which is adapted for fitting into the female fitting (75) on the cord replacement tool (50).

It will be readily appreciated how the nut-like device (230) operates in the context of the reel housing as shown in FIG. 1B. The pull cord tool (50) is placed above the upside down pull cord housing (10) and moved downwardly until the nut-like device (230) is inside of the bore (115). The two locking arms (90) and (91) are in place and the cylinders (95) and (96) are allowed to extend outwardly under the biased pressure of the spring (97) until the two ends of the cylinders (95) and (96) catch the side of the pull cord housing (10). The handle (60) is simply rotated which transfers this rotational movement through the shank (70) to the nut-like device (230). However, unlike the prior art wrench shown in FIG. 1B, the two spring-mounted locking arms (90) and (91) hold the device in place and the ratchet (80) prevents the pull cord reel (30) from winding in an undesired direction under the pressure of the reel spring (not shown). Thus, the pull cord replacement tool (50) allows one person to easily change a pull cord (40) in the pull cord housing (10).

Figure 4:
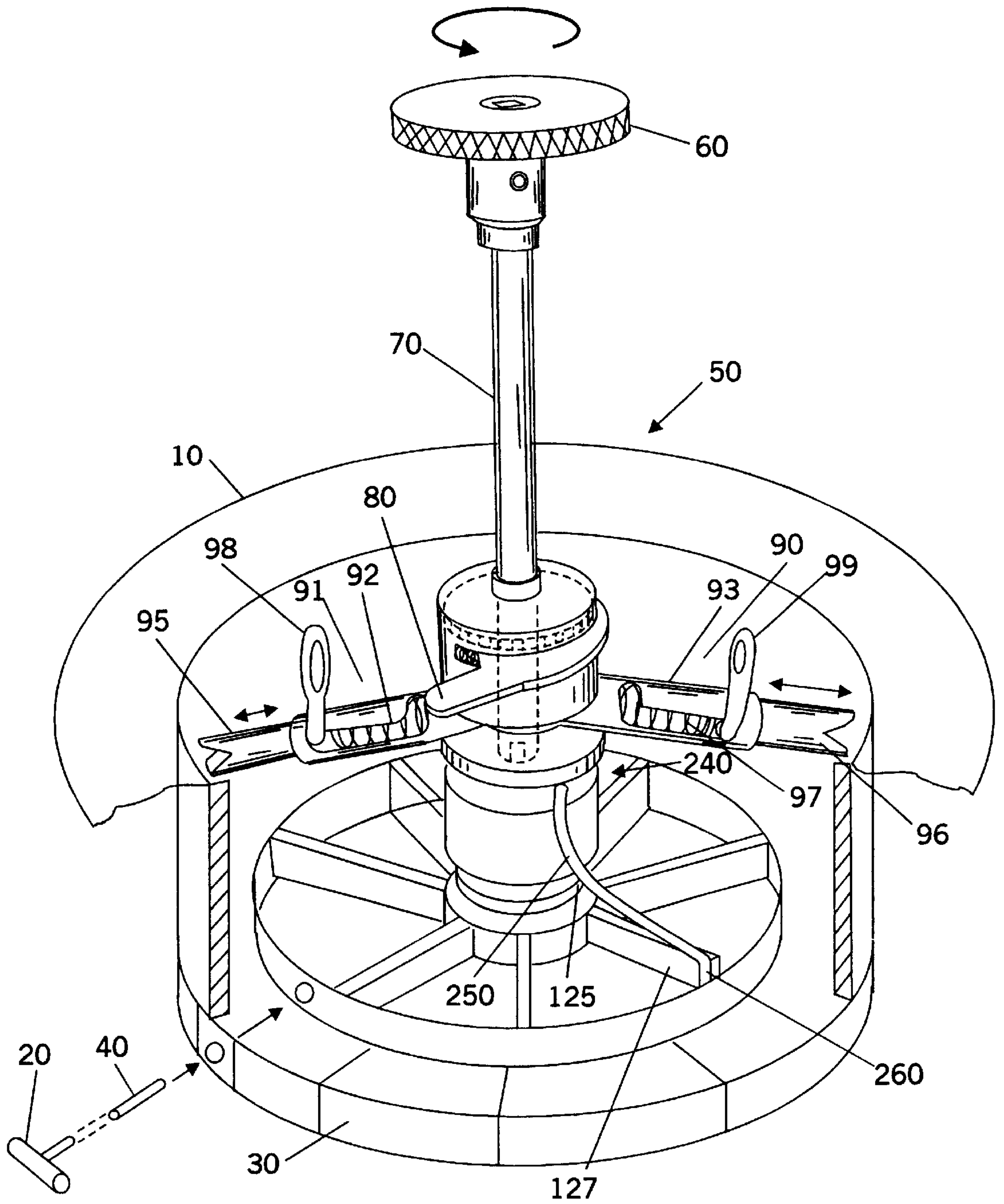
FIG. 4 shows the invention in use on a pull cord assembly using one of the tools.

FIG. 4 shows the pull cord tool (50) in use in a pull cord housing (10) which has a circular clutch (125). The tool fitting (240), which is shown in FIG. 3B, is in place over the circular clutch (125). The locking arm (250) is extended with the shank (260) inside and positioned against the rib (127). The locking arms (90) and (91) are in place and the gripping cylinders (95) and (96) are extended outwardly and fixedly mounted against a mesh side of the pull cord housing (10). The handle (60) is now ready for counter-clockwise rotation. This rotates the spindle (70) which rotates the tool fitting (240). The shank (260) is positioned against the ribs (127) which now rotates the pull cord reel (30) in a counter-clockwise direction winding it against the pressure of the spring. When the pull cord reel (30) is fully wound, the ratchet (80) prevents the pull cord reel (30) from unwinding against the pressure of the spring, because the locking arms (90) and (91) are in place against the mesh side walls of the pull cord housing (10). No hands or other intervention of the operator are now required to keep the pull cord reel (30) in the appropriate position against the pressure of the spring. The pull cord (40) is threaded through a bore on the outside of the pull cord reel housing (10) to a matching bore on the inside of the pull cord reel (30) and tied off, as is shown by the arrows. The ratchet (80) is released, allowing the pressure of the spring to begin to cause the pull cord reel (30) to wind in a clockwise direction. Slack length of the pull cord (40) will be pulled into and wound onto the pull cord reel (30) until the spring is fully uncoiled. The handle (20) will then be positioned appropriately and a portion of the cord will be tied off to hold the handle (20) in place against the outside of the pull cord reel housing (10) or at some other convenient position on the lawn mower or other device on which this small engine with the pull cord housing (10) is being used. The pull cord replacement tool (50) will be removed from the pull cord housing (10) and the pull cord housing (10) bolted back onto the motor where it is now ready for use.

Use of this tool makes what is a difficult or even impossible job for one person a simple and easy job to handle. It adapts readily to fit different types of pull cord assemblies on different types of motors and works on all known designs.

I claim:

1. A small motor starter cord replacement apparatus comprising:

(a) a handle;

(b) a spindle with said handle attached at a first end of said spindle;

(c) a hub with said spindle rotatably mounted within said hub and said hub includes a ratchet assembly connected to said spindle whereby said spindle is biased for rotatable motion in only one direction when said ratchet is engaged;

(d) a first arm and a second arm attached to said hub, said first arm and said second arm and said spindle defining a plane;

(e) in said first arm and in said second arm, a spring-mounted cylinder inside of said first arm and said second arm, said spring-mounted cylinder biased for movement distal to said hub and, at end of said cylinder distal to said hub, gripping teeth;

(f) at a second end of said spindle means for connecting said spindle to a pull cord reel on a lawn mower for rotational motion of said pull cord reel, whereby said handle is turned rotating said spindle and said pull cord reel, said hub and said spindle held into place by said spring-mounted cylinder inside of said first arm and by said spring-mounted cylinder inside of said second arm.

2. A small motor starter cord replacement apparatus of claim 1 wherein each of said gripping cylinders have a threaded bore at said distal end designed for receipt of a threaded bolt with a gripping tooth extending from said threaded bolt.

3. A small motor starter cord replacement apparatus of claim 1 wherein said means for connecting said spindle to a pull cord reel includes a female bore at said second end of said spindle, a corresponding male fitting on a hollow cylinder, said hollow cylinder of a definite size greater than a circular clutch in said reel cord housing, on the circumference of said hollow cylinder a rotatable arm terminating in an orthogonally mounted shank whereby said hollow cylinder fits over a circular clutch in said reel cord housing, said rotatable arm rotates so that said orthogonal shank attaches to a portion of said pull cord reel securely so that when said spindle is rotated, said rotational motion is communicated to said pull cord reel by said cylinder, said arm, and said shank.

4. A small motor starter cord replacement apparatus of claim 1 wherein said means for connecting said spindle to a pull cord reel includes a female bore at said second end of said spindle, a corresponding male fitting on an oblong piece, said oblong piece of a definite size to fit within an oblong bore on said pull cord reel so that when said oblong piece is fitted in said oblong bore and said spindle is rotated, said rotational movement is communicated to said pull cord reel by said oblong piece.

5. A method for replacing a cord in a pull cord starter housing for a small motor comprising:

(a) removing a pull cord housing from a motor and inverting said pull cord housing;

(b) securing a tool on the inside of said pull cord housing, said tool secured by a first spring biased arm and a second spring biased arm , said springs mounted within said arms to press moveable cylinders inside of said arms against said inside of said pull cord housing;

(c) attaching said tool to a pull cord reel on said pull cord housing containing said pull cord inside of said pull cord reel;

(d) providing a means for imparting rotational movement to said pull cord reel by said tool;

(e) winding said pull cord reel until said pull cord reel is in the fully wound position;

(f) threading a replacement pull cord into said pull cord reel and tying said cord off in a fixed position;

(g) removing said tool from the inside of said pull cord housing and allowing said pull cord reel to unwind thereby winding a replacement cord onto said pull cord reel.

6. A method for replacing a cord in a pull cord starter housing for a small motor of claim 5 comprising providing a ratchet assembly in said tool so that said means for imparting a rotational movement to said pull cord reel by said tool is biased for rotational movement in one direction only when said ratchet is engaged.

7. A method for replacing a cord in a pull cord starter housing for a small motor of claim 6 wherein said step of providing a means for imparting rotational movement to said pull cord reel by said tool includes a hollow cylinder at one end of said tool, said hollow cylinder having a rotatable arm terminating in an orthogonally mounted shank.

8. A method for replacing a cord in a pull cord starter housing for a small motor of claim 7 wherein said step of providing a means for imparting rotational movement to said pull cord by said tool includes an oblong piece to fit at one end of said tool, said oblong piece of a definite size to fit within an oblong bore in said pull cord reel so that fitting said oblong piece in said oblong bore imparts a rotational movement to said pull cord reel when a rotational movement is imparted to said tool.

9. A small motor starter cord replacement apparatus comprising:

(a) a handle;

(b) a spindle with said handle attached at a first end of said spindle;

(c) a hub with said spindle rotatably mounted within said hub and said hub includes a ratchet assembly connected to said spindle whereby said spindle is biased for rotatable motion in only one direction when said ratchet is engaged;

(d) at least two arms attached to said hub;

(e) in said at least two arms, a spring-mounted cylinder inside each of said at least two arms, said spring-mounted cylinder biased for movement distal to said hub and, at end of said cylinder distal to said hub, gripping teeth;

(f) at a second end of said spindle means for connecting said spindle to a pull cord reel on a lawn mower for rotational motion of said pull cord reel, whereby said handle is turned rotating said spindle and said pull cord reel, said hub and said spindle held into place by said spring-mounted cylinder inside each of said at least two arms.

10. A small motor starter cord replacement apparatus of claim 9 wherein each of said gripping cylinders have a threaded bore at said distal end designed for receipt of a threaded bolt with a gripping tooth extending from said threaded bolt.

11. A small motor starter cord replacement apparatus of claim 9 wherein said means for connecting said spindle to a pull cord reel includes a female bore at said second end of said spindle, a corresponding male fitting on a hollow cylinder, said hollow cylinder of a definite size greater than a circular clutch in said reel cord housing, on the circumference of said hollow cylinder a rotatable arm terminating in an orthogonally mounted shank whereby said hollow cylinder fits over a circular clutch in said reel cord housing, said rotatable arm rotates so that said orthogonal shank attaches to a portion of said pull cord reel securely so that when said spindle is rotated, said rotational motion is communicated to said pull cord reel by said cylinder, said arm, and said shank.

12. A small motor starter cord replacement apparatus of claim 9 wherein said means for connecting said spindle to a pull cord reel includes a female bore at said second end of said spindle, a corresponding male fitting on an oblong piece, said oblong piece of a definite size to fit within an oblong bore on said pull cord reel so that when said oblong piece is fitted in said oblong bore and said spindle is rotated, said rotational movement is communicated to said pull cord reel by said oblong piece.

* * * * *